N. WILLIAMS.
GATE.
APPLICATION FILED JULY 12, 1909.
964,137.
Patented July 12, 1910.
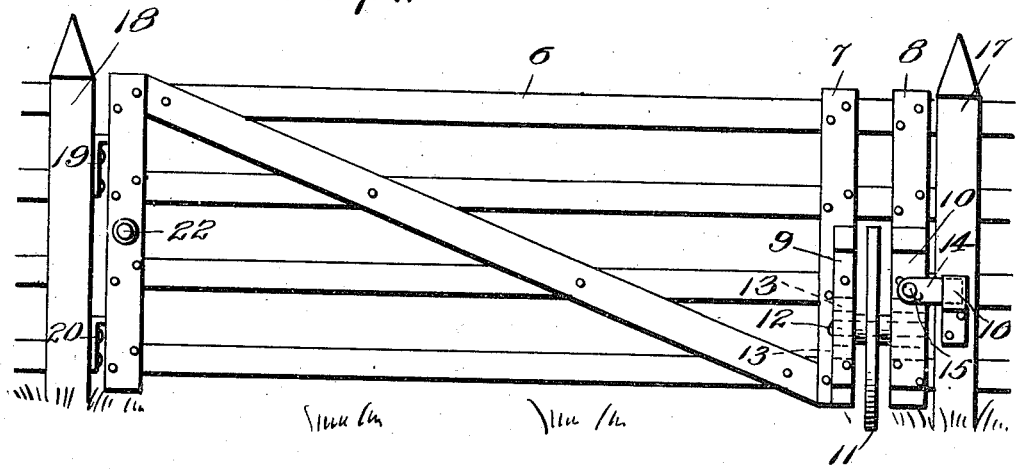
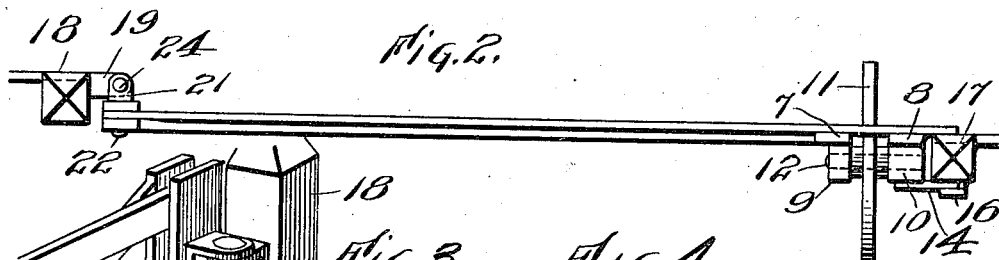
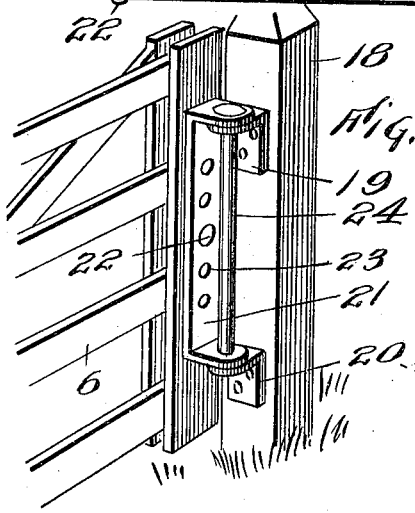
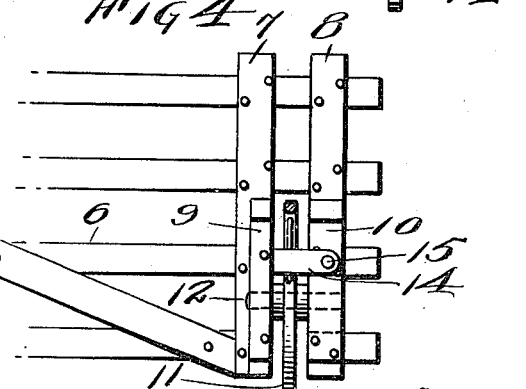
Witnesses
Inventor
N. Williams
By
Attorney

UNITED STATES PATENT OFFICE.

NATHANIEL WILLIAMS, OF OWOSSO, MICHIGAN.

GATE.

964,137.

Specification of Letters Patent. Patented July 12, 1910.

Application filed July 12, 1909. Serial No. 507,256.

*To all whom it may concern:*

Be it known that I, NATHANIEL WILLIAMS, a citizen of the United States, residing at Owosso, in the county of Shiawassee and State of Michigan, have invented certain new and useful Improvements in Gates, of which the following is a specification.

This invention relates to gates and comprises particularly a swinging gate mounted upon a wheel at its free end which supports the weight of the free end of the gate and enables it to be easily opened and closed. The wheel is adjustable to various heights to regulate the height of the gate from the ground.

The invention also comprises a novel hinge by which the gate is connected to the post, said hinge permitting the gate to swing when it is opened or closed and also permitting it to swing vertically in order to adjust itself to hillsides or uneven ground.

The invention also comprises a novel form of latch for holding the gate in either open or closed position.

The invention is illustrated in the accompanying drawings in which—

Figure 1 is a front elevation of the gate closed; Fig. 2 is a top view thereof; Fig. 3 is a detail in perspective of the hinge; Fig. 4 is a detail in front elevation showing the latch engaging the wheel to hold the gate open.

Referring specifically to the drawings, 6 indicates a gate of any ordinary or suitable construction except as hereinafter specified. Near its free or swinging end it has two upright bars 7 and 8 on the side of which are mounted blocks 9 and 10. The lower panels of the gate reach only to the bar 7, whereby a space is formed between the uprights 7 and 8 to receive the wheel 11, which may conveniently be an old carriage wheel or the like. Many carriage wheels are available for the purpose without the necessity of building a special wheel. The wheel is mounted upon an axle or bolt 12 which extends across between the pieces 9 and 10, and the axle is adjustable in a series of holes 13 whereby the wheel may be raised or lowered and consequently the front end of the gate will be supported at a greater or less distance above the ground.

A latch is provided as indicated at 14, consisting of a plate or piece of metal pivoted at 15 to the block 10 and arranged to engage a keeper 16 attached to the side of the gate post 17. When the gate is closed the latch may be swung down within the keeper, to hold the gate closed. The latch may also be used to hold the gate open, by being swung over on its pivot to enter its free end between the spokes of the wheel, thereby preventing the wheel from turning and holding the gate in any desired position, either wholly or partly open, thereby providing very simple means for performing the functions indicated.

The gate post on which the gate is hung is indicated at 18, and the hinge comprises two members 19 and 20 secured to said post, and a strap or yoke 21 attached to the side of the hanging stile of the gate by a pivot bolt 22 which may be vertically adjusted in a series of holes 23 in the strap 21, and the hinge members 19, 20 and 21, are connected by a vertical hinge bolt 24 which extends through the offset ends of said members. The hinge will turn to swing on said bolt, and it will also swing or raise and lower vertically on the pivot 22 to allow the wheel 11 to travel over uneven ground or up and down a hillside if the gate is set on a hillside. In other words, a compound movement is allowed, that is, lateral movement as in swinging open or closed and the vertical movement as described.

No special parts are required, since the hinge members can be readily made of ordinary strap iron and a common bolt, and an old carriage wheel or the like can be used for the wheel. Therefore it may readily be constructed by any one from materials easily obtainable. The wheel supports the weight of the gate and rolls over the ground as the gate is opened or closed, allowing it to be moved very easily.

The invention is not limited to the especial form shown, but various modifications may be made within the scope thereof, the essential ideas being the employment of the wheel and latch and the hinge permitting the compound movement referred to, which is practically necessary in order that the wheel may follow the ground under all conditions. Evidently a hinge which will not permit vertical movement of the gate would prevent the wheel traveling on uneven or inclined ground, whereas the gate shown will swing open either up hill or down hill, which is a decided advantage in hillside gates.

I claim:

The combination with a post, and a gate having a hanging stile rigid with the rest of the gate, of a hinge connection between the post and said stile, one hinge member comprising a yoke with an elongated body pivotally connected intermediate its ends to the side of the stile by a horizontal pivot, the ends of the yoke being bent outwardly to form ears at an angle to the plane of the gate, whereby the gate is offset so that it may be swung over vertically beside the post, other hinge members attached to the post and projecting therefrom to a position beside said stile, and a vertical pivot bolt extending through said ears and the hinge members attached to the post.

In testimony whereof, I affix my signature in presence of two witnesses.

NATHANIEL WILLIAMS.

Witnesses:
    FRANCIS E. PHILLIPS,
    JOHN WOOD.